Sept. 1, 1953 A. G. DEAN 2,650,548
ENGINE MOUNTING MEANS, ESPECIALLY MEANS FOR MOUNTING
ENGINES BENEATH RAILWAY PASSENGER CARS
Filed Oct. 26, 1949 3 Sheets-Sheet 1
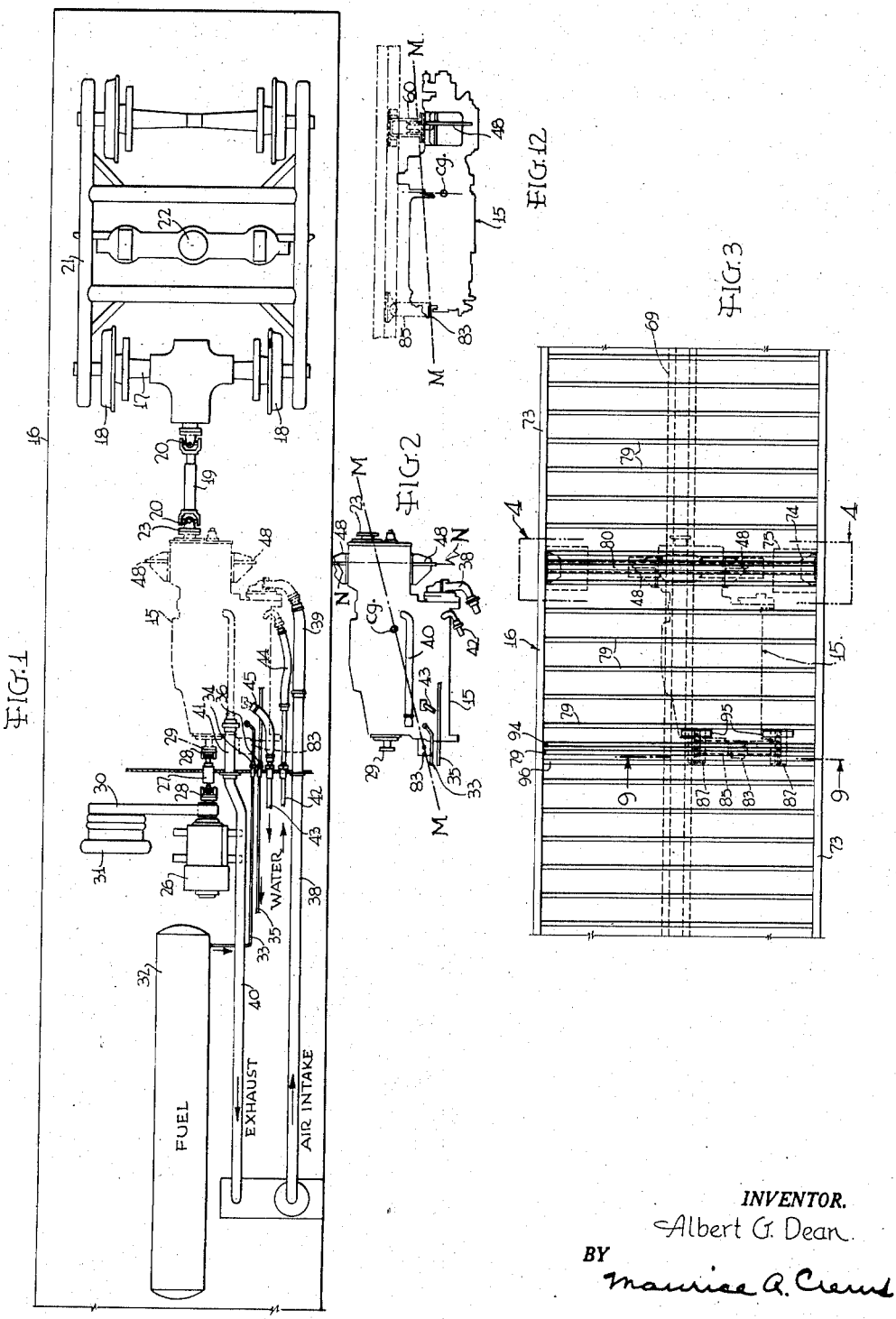
INVENTOR.
Albert G. Dean
BY
Maurice A. Crews
ATTORNEY

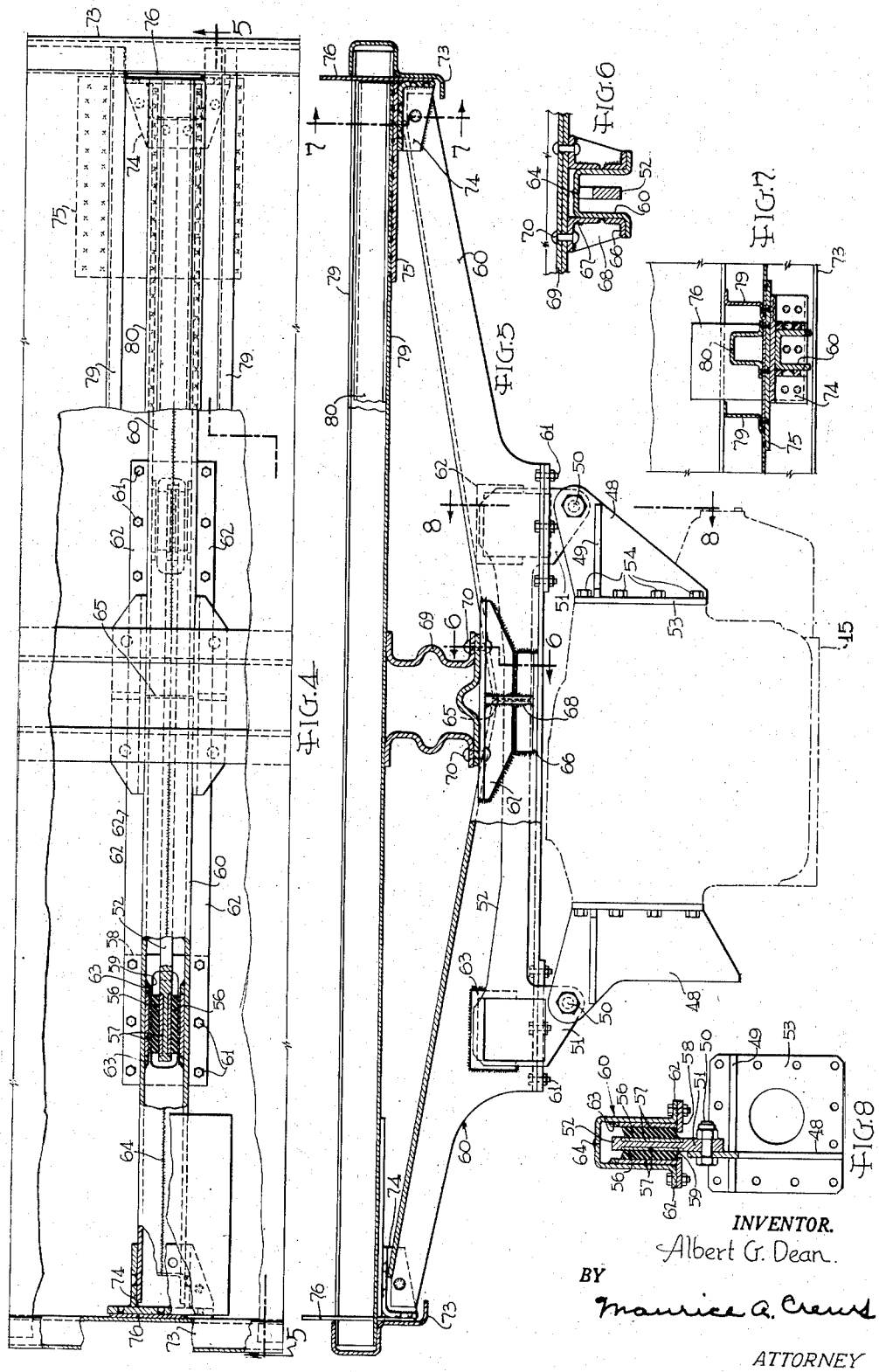

Sept. 1, 1953  A. G. DEAN  2,650,548
ENGINE MOUNTING MEANS, ESPECIALLY MEANS FOR MOUNTING
ENGINES BENEATH RAILWAY PASSENGER CARS
Filed Oct. 26, 1949  3 Sheets-Sheet 3
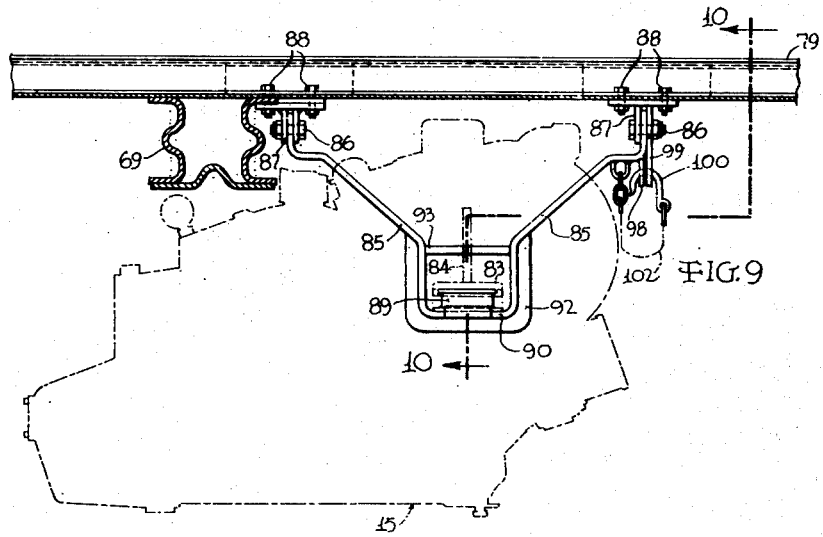
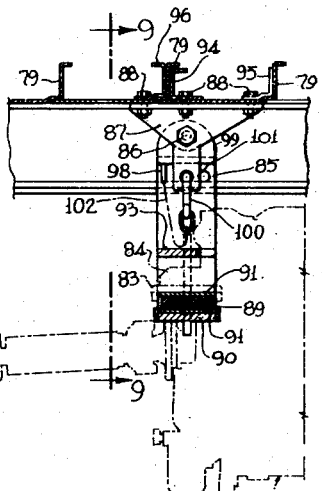
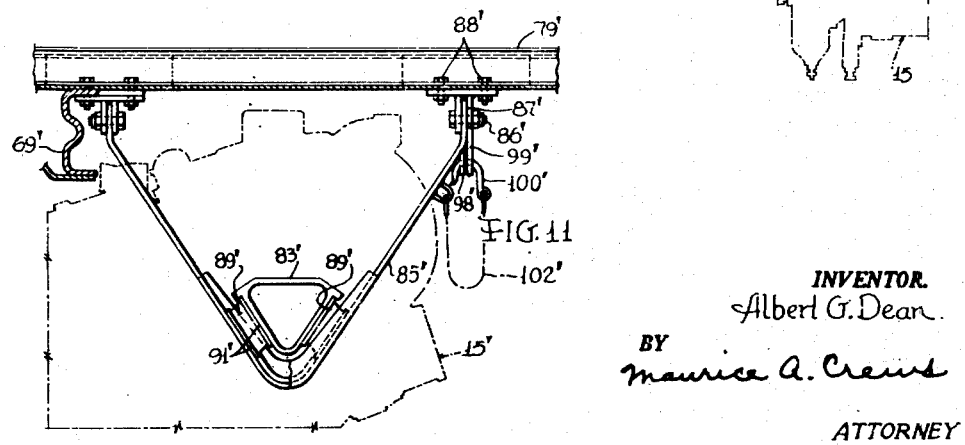
INVENTOR.
Albert G. Dean.
BY
Maurice A. Crews
ATTORNEY Patented Sept. 1, 1953

2,650,548

UNITED STATES PATENT OFFICE 2,650,548

ENGINE MOUNTING MEANS, ESPECIALLY MEANS FOR MOUNTING ENGINES BENEATH RAILWAY PASSENGER CARS

Albert G. Dean, Narberth, Pa., assignor to The Budd Company, Philadelphia, Pa., a corporation of Pennsylvania Application October 26, 1949, Serial No. 123,654

11 Claims. (Cl. 105—133)

This invention relates to engine mounting means, especially to means for mounting engines beneath the floor of a railway passenger car, and has for an object the provision of improvements in this art.

One of the particular objects is to provide an engine mounting having torsional resilience to eliminate vibrations due to torque roughness and various mechanical unbalance characteristics of the engine and its driving connections.

Another object is to provide engine mounting means which will permit the engine to be removed or replaced quickly.

Another object is to provide engine mounting means which furnishes resilient support but which will prevent the engine from breaking loose and falling down in case of failure of the resilient mounting means.

Another object is to provide engine mounting means which will accommodate engines of different size and type.

Another object is to provide engine mounting means which minimizes distortion of the car body and provides great strength with relatively light parts.

The above and other objects of the invention and various novel features will be evident from the following description of an exemplary embodiment, reference being made to the accompanying drawings thereof, wherein:

Fig. 1 is a top plan view, generally diagrammatic in nature, showing the arrangement of the engine in relation to associated parts on a car;

Fig. 2 is a plan view of the engine unit alone, this unit including drive transmission means in the present case, showing the points of disconnection;

Fig. 3 is a top plan view of the engine and parts closely associated therewith, as in Fig. 1, but taken above the floor;

Fig. 4 is an enlarged plan view, taken in the zone 4—4 of Fig. 3, parts being broken away in places;

Fig. 5 is a vertical section taken on the line 5—5 of Fig. 4;

Fig. 6 is a vertical section taken on the line 6—6 of Fig. 5;

Fig. 7 is a vertical section taken on the line 7—7 of Fig. 5;

Fig. 8 is a vertical section taken on the line 8—8 of Fig. 5;

Fig. 9 is an inboard vertical elevation and section taken about on the line 9—9 of Fig. 3;

Fig. 10 is a vertical section taken on the line 10—10 of Fig. 9;

Fig. 11 is a view similar to Fig. 9 but showing a modification; and

Fig. 12 is a diagrammatic elevation showing, with Fig. 2, the relationship of the supports to the center of gravity of the engine unit.

The invention has been developed in connection with the mounting of a diesel engine unit beneath a railway passenger car, the unit including, along with the engine in the same frame or housing, a power transmission, such as a fluid torque converter, hence the description will be directed toward this embodiment.

Referring to the diagram of Fig. 1, an engine unit 15, properly supported beneath a car 16, as by supporting means which will be explained later, drives the axle 17 of a pair of wheels 18 through a drive shaft 19 having flexible joints 20 and a splined telescopic connection of known type which will maintain the driving relationship when the truck 21 carrying the wheels turns about its king pin 22. The engine and its drive shaft have a disconnectible joint with plate flanges 23 which in service are secured together, as by bolts.

At the other end, the engine is connected to drive a device 26, such as a generator, through a shaft 27 having flexible joints 28, a splined telescopic connection, and separable joint flange plates 29 which are arranged to be bolted together. The generator may be connected, as by belting 30 and suitable pulleys, to drive another device 31, such as an air compressor.

The engine may be supplied with fuel from a tank 32, as by a fuel pipe line 33 having a quick disconnection joint 34. Excess fuel which passes the fuel injection valves is returned to the tank by a pipe 35 having a quick disconnection joint 36. Air is supplied to the air compressor of the engine by an intake pipe 38 having a quick disconnect flexible connection 39. An exhaust pipe 40 leads away from the engine, a quick disconnect flexible heat-resistant connection 41 being provided therein. Cooling fluid pipe lines 42, 43 for the engine are provided with quick disconnect joints 44, 45 respectively.

These drive shafts and service pipe lines with their joints are illustrated to show how the engine unit may be made ready for complete removal, leaving it connected only at its supports. If there are other shafts or pipes or wiring conductors they may similarly be provided with quick disconnect joints in known manner and do not require specific disclosure herein.

The parts in Fig. 2 are designated by the same reference characters as in Fig. 1, the engine unit here being shown removed from the car. The location of the engine unit of Fig. 2 relative to Fig. 1 is also significant, indicating that the engine when fully disconnected and lowered is moved straight sidewise until it is completely removed from beneath the car. It is the practice to run a carriage under the engine and to lift it slightly by elevating means, such as jacks carried on the carriage and engaging jacking pads on the engine unit, then to disconnect the engine from its mountings, lower it until it clears the mountings and all other parts, and finally to move the carriage sidewise until the engine clears the car, or as much further as may be necessary for the purpose in view.

Coming now to the engine mounting means, as shown in Figs. 4 to 10, a three-point support is provided, a two-point mounting being provided at the outboard or wheel-driving end and a single-point mounting being provided at the inboard end. The two-point support at the outboard end furnishes strong resistance against turning torque imposed on the drive shaft and takes end thrust incident to starting and stopping. It is especially adapted, because of its longitudinal strength and stiffness, to resist the longitudinal impact loads of coupling and sudden starts and stops which are common in railroad vehicle operation. The torque and end thrust are transferred to a part of the underframing and body which is more adapted to take these loads than is the structure at the inboard mounting. The inboard mounting is required to carry only vertical loads and is made to have swinging movement so it will not take end thrust but instead will allow all end thrust to be passed to the outboard mountings. When disconnected, it has further swinging movement to clear the engine unit to allow it to be lowered on the carriage. The outboard end is released for lowering by the removal of two bolts.

Considering first the outboard mountings and referring to Figs. 4 to 8, the engine unit 15 is provided on the sides with support ears 48 having rigidifying ribs 49, the ears being secured, as by bolts 50, to the depending ears 51 of a floating anchor yoke 52. The ears 48 of the engine unit may be formed on plates 53 which are attached to the engine unit casing by suitable means such for example as bolts 54.

The yoke 52 is resiliently supported, as by rubber pads 56 carried between plates 57 which are integrally bonded thereto, the pads and plates together forming sandwich units which can be separately made and assembled. As best shown in Fig. 8, the inner plates 57 are set in recesses or niches cut in the sides of the yoke member 52 while the outer plates 57 rest on a support plate 58 at the sides of an oversized opening 59 therein through which the depending ears 51 extend. The plates 58 are supported by a transverse beam 60 mounted on the car underframe, the plates being secured beneath the beam, as by bolts 61 in out-turned flanges 62 of the beam. The uncut portions of the plates 58 underlie the yoke 52 and are adapted to serve as safety supports for the yoke 52 in case the rubber pads 56 fail or yield unduly. On the inner sides, the beam 60 has secured thereto, as by welding, inverted U-shaped members 63 which fit around the tops and down along the upper part of the sides of the outer sandwich plates 57 to hold them against upward and sidewise movement. Both plates 57 of the resilient units are thus socketed to resist movement in all directions relative to their supporting members.

The beam 60, for convenience, may be formed of four main parts welded together along a longitudinal seam 64 and a transverse seam 65. At the mid-portion of the beam on each side there are welded on and welded together a lower angle piece 66, an upper angle piece 67 and a strut plate 68, and the side flanges of the upper angle pieces are secured to the center sill 69 of the car as by rivets 70.

At the outer ends the beam 60 is secured to the side sills 73 of the car, as by brackets 74 which are plug welded to a horizontal stiffening plate 75 and to a vertical stiffening plate 76, which stiffening plates are in turn welded to the adjacent parts of the car.

At this location the regular floor pans, built up of angular transverse beams 79 (see Fig. 7) are reinforced by a relatively heavy transverse rigidifying beam 80 suitably welded by its lower flanges to the bottom plate portion of one of the members 79, the inverted member 80 forming a box section which strongly resists inward bending of the side sills 73 and buckling of the floor.

The beam 60 and the rigidifying member 80, together with the side sills and floor pan, form in effect an inverted king truss with the center sill acting as the king strut at the apex. In addition, the center sill through the connection at the rivets 70 carries a large part of the load directly. The load is approximately balanced on each side of the center sill. This construction is very strong and rigid even though relatively light parts are used.

At the inboard end, as shown in Figs. 9 and 10, the engine unit 15 is provided with a projecting supporting pad 83 rigidified by a buttress rib 84, and this pad is supported by a swingable member or bail 85 carried by hinge bolts 86 from depending anchor brackets 87. The anchor brackets are secured beneath the car floor, as by bolts 88. A resilient unit or sandwich 89, which as a unit may be identical with those used at the outboard end, is located between the engine pad 83 and a bottom cross piece or stirrup 90 of the bail, the metal plates 91 of the sandwich being suitably socketed in the adjacent parts. The bail and stirrup are rigidified by an exterior rib 92 and an upper cross member 93. The cross member 93 limits the upward movement of the rib 84. The sides of the stirrup limit the lateral movement of the engine pad 83.

The floor is rigidified locally by angle plates 94, 95 at the brackets 87 and is rigidified and strengthened across its entire width by an angular transverse reinforcing member or beam 96. The support at the inboard end is located at one side of the center sill 69.

Means are provided for keeping the bail in position for supporting the engine unit even if the resilient pad unit 89 is destroyed, and for holding the bail out of the way when the engine unit is being lowered. This safety means here comprises depending plates 98 and 99 on the bail 85 and bracket 87 respectively, these plates having aligned holes for receiving a pin or hook 100. The holes are larger than the diameter of the hook pin to allow some movement on the resilient pads. Another hole 101 provides for holding the bail out of the way when swung out and up. The hook pin may be held captive by a chain 102.

In Fig. 11 there is shown a modification in which two pads 89' are used in angular relationship to each other, the bracket pad 83' of the engine and the bail 85' having suitable sockets for the metal plates 91' of the sandwiches. Other parts are readily identified and are designated by the same reference characters as in Fig. 9 but with a prime (') added.

In action, the resilient supports absorb engine vibrations without transmitting noticeable vibrations to the passengers. The engine cylinder bores are inclined upwardly from a horizontal plane, here the angle being about 20 or 25 degrees, and the supports absorb the horizontal components as well as the vertical components of engine vibration. For side movement, all resilient pads are placed in shear along the flat. For vertical movement, the outboard mounting pads are placed in shear along the flat and the inboard mounting pad is placed in compression and tension across its thin dimension. For longitudinal movement along the center line of the car, the inboard mounting pad is placed in slight shear along the flat but the bail swings to relieve it so this movement is absorbed in compression across the flat in the outboard mounting pads. Such longitudinal loads are transmitted almost wholly into the center sill of the car which is very heavy and rigid. Driving torque is placed largely on the spaced outboard mountings which are located near the center of the car, the drive shaft being almost exactly along the longitudinal center line below the center sill, hence torque loads are quickly absorbed in the strong rigid part of the car and passed into the trucks.

From Figs. 2 and 12 it can also be seen that the center of gravity or mass of the engine unit is so located relative to the supports as to give least vibration. From Fig. 2 it can be seen that in plan the line M—M which is drawn through the inboard support and through a point midway of the length of a line N—N joining the outboard supports passes through the center of gravity C. G. of the engine unit. In Fig. 12 the line M—M through the front and rear supports passes above the center of gravity C. G.

To remove the engine, a lift conveyor is run in under the engine and lift jacks are engaged with the engine unit at lift pads provided thereon. There are three lift pads, each located near a suspension point of the engine. The jacks are operated to take the weight of the engine unit and to lift it slightly, whereupon the bolts 50 at the outboard end are removed. The inboard end is raised until the pad clears its retaining edges, then the hooks 100 are removed and the bail 85 swung clear of the supporting parts 83, 84 on the end of the engine unit. The engine shaft and service line connections are understood to have been disconnected. The jacks are now turned to lower the engine unit until it clears all obstructions, after which it may be run out sideways on the conveyor until it clears the car and its tracks.

The invention provides a simple, efficient and strong support for an engine unit and a support which permits the unit to be installed or removed very quickly.

The single support at the inboard end allows large tolerances in manufacture. It can be mislocated by a large amount without interfering with the action of the suspension. The engine bracket merely rests under its own weight in the support but cannot get out of position, there being means to limit its movement longitudinally, laterally and vertically.

The outboard supports, including the yoke member 52 and related parts, require accurate work with small tolerances but they are so designed and arranged as to make these tolerances easy to maintain and positively locate the attaching elements for easy installation of the engine.

All three supports provide positive mechanical stops both laterally and vertically while the outboard supports provide resilient stops longitudinally, the resilient stops being rigidly backed by very strong structural parts.

While specific forms of the invention have been illustrated and described it is to be understood that there may be various embodiments within the scope of the invention.

What is claimed is:

1. Mounting means for an engine unit on a vehicle comprising in combination, resilient mounting pads at the drive shaft end of the engine unit and within its width, said pads being arranged flatwise in a vertical plane transverse to the engine drive shaft axis and perpendicular to the line of movement of the vehicle, and a resilient mounting pad at the other end of the engine unit arranged flatwise longitudinally of the engine shaft axis.

2. Mounting means for an engine unit on a vehicle comprising in combination, resilient mounting pads at the drive shaft end of the engine unit arranged flatwise in a vertical plane transverse to the engine drive shaft axis and perpendicular to the line of movement of the vehicle, and a resilient mounting pad at the other end of the engine unit arranged flatwise longitudinally of the engine shaft axis, supports for the pads at the drive shaft end connected to take end thrust loads, and a support for the pad at the other end which swings with endwise movement of the engine unit so that it is relieved of end thrust loads.

3. Mounting means for an engine unit on a rail car having side sills and a center sill comprising in combination, a pair of outboard supports at the drive shaft end of the engine unit, which engine unit is located inboard of the drive shaft and wheels of an end truck of the rail car and connected to drive the wheels, said outboard supports being spaced apart laterally and located on opposite sides of the center sill of the car, and a single inboard support for the other end of the engine unit, the outboard supports comprising connecting means inserted through transversely extending side overlapping parts which are so disposed as to permit downward and lateral movement of the engine unit when the connecting means are removed, and the inboard support comprising a bail which is mounted to swing axially of the engine unit axis to clear related parts to permit downward and lateral movement of the engine unit, said outboard supports including resilient elements providing relatively great lateral and vertical movement and relatively small axial movement, and said inboard support including a resilient element providing relatively great lateral and axial movement and relatively small vertical movement.

4. Mounting means for an engine unit as set forth in claim 3, in which the outboard supports are carried by a common resiliently mounted yoke and in which the inboard support bail carries the resilient support element beneath an engine bracket part.

5. Mounting means for mounting an engine unit beneath a railway car, comprising in combination with an engine unit connected by a longitudinal shaft to drive an axle of a car truck, spaced supports for the engine unit at its drive shaft end, the car having a floor, a center sill and side sills, an inverted king truss supporting said spaced supports, said truss being anchored at the apex to the center sill and at the ends to the side sills, and a suspension support for the other end of the engine carried through intermediate means from the car sills.

6. Mounting means for mounting an engine unit beneath a railway car having a center sill, side sills and a floor thereon and also having a truck at one end with an axle driven by the drive shaft of said engine unit, in combination, outboard supports spaced apart and located on opposite sides of said center sill, and inverted king truss secured to said side sills and center sill for carrying said spaced supports, said king truss including a reinforcing beam for said floor between the side sills, and a single support for the other end of the engine unit carried through intermediate means from the car sills.

7. Mounting means for an engine unit as set forth in claim 6 in which said two outboard supports include resilient elements carrying a yoke to which said engine unit is connected.

8. Mounting means for an engine unit as set forth in claim 6 in which said supports include resilient pad units having metal plates on each side, said truss having a beam-like lower portion open on the bottom side, and removable beam plates secured beneath said beam-like portion securing said pads in position, each beam plate having an opening therethrough, the pads between them carrying a support member which extends through an opening in said beam plate to provide a depending part to which the engine unit is secured, said support member also having a part which extends over the edge of said plate at the side of the opening to prevent the engine from dropping down if said resilient pads fail.

9. Mounting means for an engine unit beneath a vehicle comprising in combination, a pair of supports for the engine unit at its drive shaft end, said supports being spaced apart with the drive shaft between them, a single support at the other end of the engine unit, the single support comprising a bail swingable axially of the engine, resilient elements included in the two supports at the drive end providing relatively great lateral and vertical movement and relatively small axial movement, and a resilient element included in the support at the other end providing relatively great lateral and axial movement and relatively small vertical movement.

10. Mounting means for an engine unit beneath a vehicle comprising in combination, a pair of laterally spaced supports for the engine unit at the drive end, the supports being disconnectible for lowering the engine unit, a single intermediate support for the other end of the engine unit, resilient elements of elastic material and of flat shape disposed flatwise in a transverse vertical plane included in the two supports at the drive end providing relatively great lateral and vertical movement and relatively small axial movement, and a resilient element of elastic material and of flat shape disposed flatwise in a horizontal plane included in the support at the other end providing relatively great lateral and axial movement and relatively small vertical movement.

11. Mounting means for an engine unit beneath a vehicle comprising in combination, laterally spaced supports, including resilient elements of elastic material and of flat shape disposed flatwise in a transverse vertical plane at one end of the engine unit, one on each side thereof, means disconnectibly connecting the engine unit to parts suspended by the resilient elements, a support including a resilient element of elastic material and of flat shape disposed flatwise in a horizontal plane for the other end of the engine unit located near the center of its width, a swingable member carrying said last named resilient element, said resilient elements of the first said two supports at the drive end providing relatively great lateral and vertical movement and relatively small axial movement, and said resilient element at the other end providing relatively great lateral and axial movement and relatively small vertical movement.

ALBERT G. DEAN.

References Cited in the file of this patent

UNITED STATES PATENTS

| Number | Name | Date |
|---|---|---|
| 1,125,216 | Turney | Jan. 19, 1915 |
| 1,262,577 | Bowen | Apr. 9, 1918 |
| 1,566,299 | Winther | Dec. 22, 1925 |
| 1,691,579 | Melcher | Nov. 13, 1928 |
| 1,823,203 | Knecht | Sept. 15, 1931 |
| 2,083,277 | Scott | June 8, 1937 |
| 2,190,144 | Blomberg et al. | Feb. 13, 1940 |

FOREIGN PATENTS

| Number | Country | Date |
|---|---|---|
| 352,095 | Italy | Sept. 4, 1934 |

OTHER REFERENCES

Ser. No. 288,972, Julien et al. (A. P. C.), published May 25, 1943, now abandoned.